US006923010B2

(12) United States Patent
Small et al.

(10) Patent No.: US 6,923,010 B2
(45) Date of Patent: Aug. 2, 2005

(54) SLUSH BEVERAGE MAKER

(75) Inventors: David B. Small, San Jose, CA (US); Scott D. Bekerman, Campbell, CA (US); Leslie E. Allen, Riverbank, CA (US); Brian D. Farley, Dublin, CA (US)

(73) Assignee: Shoot The Moon Products II, LLC, Pleasanton, CA (US)

( * ) Notice: Subject to any disclaimer, the term of this patent is extended or adjusted under 35 U.S.C. 154(b) by 45 days.

(21) Appl. No.: 10/468,458
(22) PCT Filed: Dec. 31, 2002
(86) PCT No.: PCT/US02/41844
§ 371 (c)(1), (2), (4) Date: Aug. 20, 2003
(87) PCT Pub. No.: WO03/056985
PCT Pub. Date: Jul. 17, 2003

(65) Prior Publication Data
US 2004/0074394 A1 Apr. 22, 2004

Related U.S. Application Data
(60) Provisional application No. 60/344,043, filed on Jan. 3, 2002.

(51) Int. Cl.⁷ .................................................. A23G 9/12
(52) U.S. Cl. ............................................ 62/68; 62/342
(58) Field of Search ........................... 62/68, 342, 343, 62/457.1, 457.2

(56) References Cited

U.S. PATENT DOCUMENTS

| 4,488,817 A | 12/1984 | Uesaka et al. |
| 4,669,275 A | 6/1987 | Ohgushi et al. |
| 4,736,600 A | 4/1988 | Brown |
| 4,741,174 A | 5/1988 | Uesaka |
| 5,967,226 A | 10/1999 | Choi |

Primary Examiner—William E. Tapolcai
(74) Attorney, Agent, or Firm—Bell, Boyd & Lloyd LLC

(57) ABSTRACT

A slush beverage maker is provided that is easy to assemble and disassemble, has few parts, and is easy to operate. The slush beverage maker has a mixing chamber for receiving ingredients to make a slush beverage. An auger is received within the mixing chamber to mix the ingredients. An ice drum is received within the auger in the mixing chamber. An ice blade is disposed in the ice drum to stir the ice mixture received by the ice drum when making a slush beverage. A hand crank is connected to both the auger and the ice blade to rotate both simultaneously. A blowby area in the mixing chamber outside the auger provides continuous flow of the slush beverage mixture, thereby avoiding freezing the auger within the mixture. Moreover, the ice blade speeds up the heat transfer between the slush beverage mixture and the ice mixture, thereby decreasing the time required to make a slush beverage.

26 Claims, 6 Drawing Sheets

SLUSH BEVERAGE MAKER

CROSS-REFERENCE TO PARENT APPLICATIONS

This application is the national phase under 35 U.S.C. § 371 of PCT International Application No. PCT/US02/41844, which has an International filing date of Dec. 31, 2002, which designated the United States of America, and which claims the priority of U.S. Provisional Patent Application No. 60/344,043 filed Jan. 3, 2002. The entire contents of each of the above-identified applications are hereby incorporated by reference.

FIELD OF THE INVENTION

The present invention relates to a slush beverage maker. More particularly, the present invention relates to a slush beverage maker having a blade that rotates a salt and ice mixture to more quickly make a slush beverage. Still more particularly, the present invention relates to a slush beverage maker having a blowby area that eliminates locking of the auger within a mixing chamber.

BACKGROUND OF THE INVENTION

Slush beverage machines are typically utilized to produce frozen or semi-frozen beverages. Existing slush beverage makers are generally for commercial use, and, therefore, are complex, large and unattractive. Due to the complexity and large number of parts of the commercial slush beverage makers, they are high maintenance machines. Maintenance of commercial slush beverage makers generally includes daily disassembly of the slush beverage makers and lubrication of the parts, as well as requiring trained personnel to operate, maintain, assemble and disassemble the makers. The commercial slush beverage makers do not translate into an inexpensive and easy to use slush beverage makers for home use.

Another problem with commercial slush beverage makers is that long periods of time are required to transform liquids into a frozen slush beverage, typically taking over two hours. Such a lengthy period of time is not acceptable or practical for preparing a slush beverage at home.

Another problem with existing commercial slush beverage makers is that they use refrigeration to cool the liquid in order to make a slush beverage. Refrigeration is not cost effective nor practical for a home slush beverage maker.

Another problem with existing commercial slush beverage makers is that the machines need to be substantially full of slush beverage in order to dispense properly. In commercial environments, slush beverage makers are easily kept substantially full of slush beverage as the makers are in constant use. However, keeping a slush beverage maker substantially full in the home environment is not practical.

Thus, there is a continuing need to provide improved slush beverage makers.

SUMMARY OF THE INVENTION

The slush beverage maker of the present invention is compact, easy to assemble and disassemble, has few parts, and is simple to operate.

The slush beverage maker operates by mixing/rotating a high Brix solution of sugar water around a drum filled with ice and salt. Thermal equilibration transfers the cold from the ice mixture in the drum to the sugar water outside the drum, thereby freezing the sugar water solution. Keeping the sugar water solution in motion throughout the thermal equilibration process creates a mixture having a slush consistency. The sugar water solution freezes and sticks to the ice drum during the process. The rotating auger scrapes the ice crystals off the drum and keeps the ice crystals in motion. The rotating auger also provides the downward force to dispense the frozen slush beverage from the container.

The slush beverage maker has a mixing chamber for receiving the ingredients to make the slush beverage. An auger is received within the mixing chamber to mix the ingredients. An ice drum is received within the auger in the mixing chamber. An ice blade is disposed in the ice drum to stir the ice mixture received by the ice drum when making a slush beverage. A hand crank is connected to both the auger and the ice blade to rotate both simultaneously. A blowby area in the mixing chamber outside the auger allows continuous flow of the slush beverage mixture. The helical shaped auger provides downward flow to the slush beverage mixture. The blowby area provides a path for the slush beverage to flow back up the mixing chamber. Moreover, the ice blade within the ice chamber agitates the ice/salt mixture in order to speed up the heat transfer between the slush beverage mixture and the ice mixture, thereby decreasing the time required to make a slush beverage to less than five minutes.

By having few parts, the slush beverage maker of the present invention is easy to assemble and disassemble. Moreover, very little maintenance is required to keep the slush beverage maker in operating condition. Operating the slush beverage maker merely requires adding ingredients to the mixing chamber and to the ice drum, turning the crank to rotate both the auger and the ice blade simultaneously, and opening a valve to dispense the produced slush beverage once the sugar water solution has reached a desired consistency.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of the original disclosure.

DETAILED DESCRIPTION OF THE INVENTION

Figure 1:
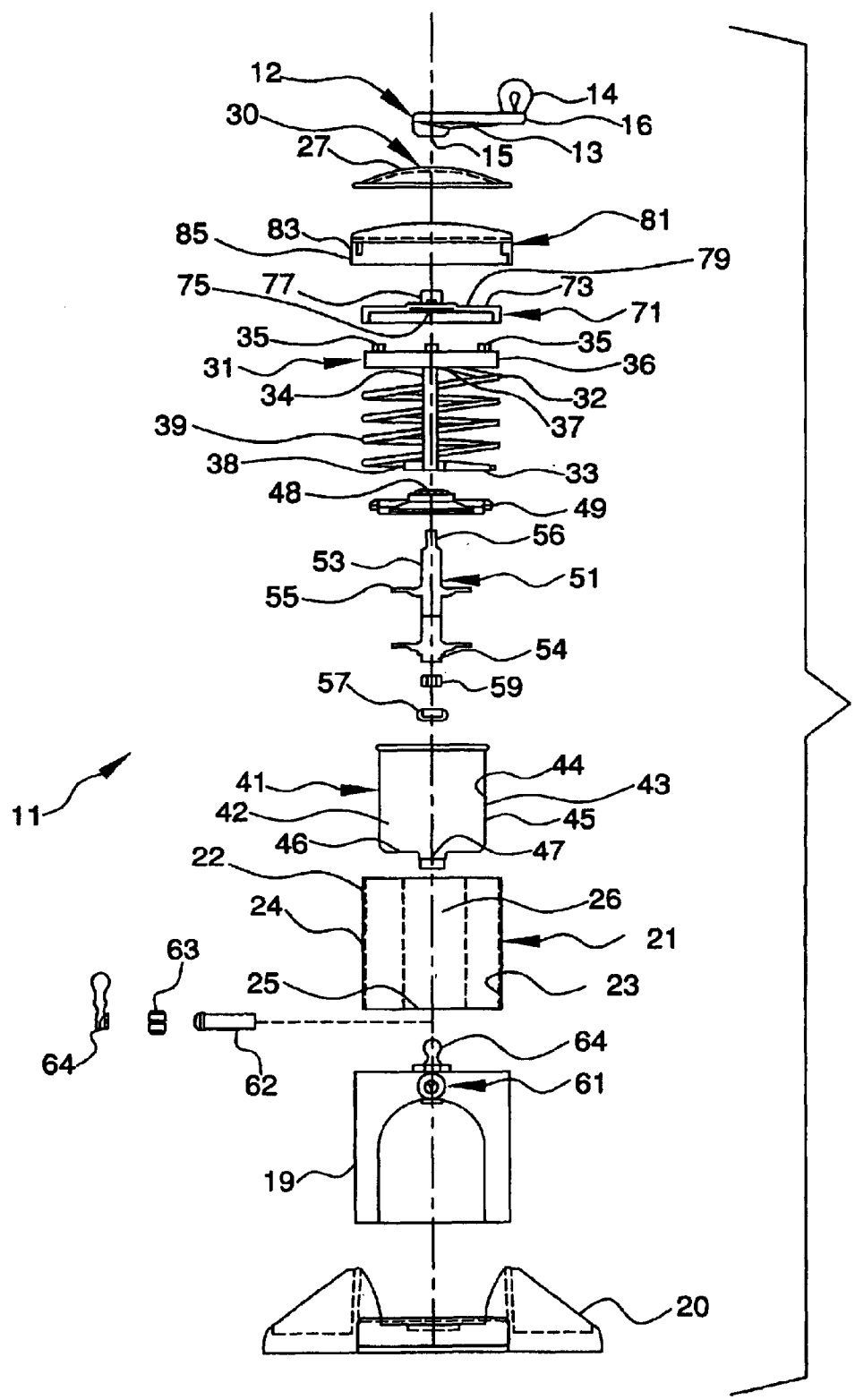
FIG. 1 is an exploded front elevational view of the slush beverage maker according to a first embodiment of the present invention.

As shown in FIGS. 1–6, a slush beverage maker 11 according to a first embodiment of the present invention includes a mixing chamber 21, an auger 31, an ice drum 41, an ice blade 51, a crank assembly 12 and a valve assembly 61. The slush beverage maker provided by the present invention is compact, has few parts, and quickly and easily makes a slush beverage.

The slush beverage maker 11 has a base 20 and a stand 19, as shown in FIG. 1, that support the mixing chamber 21 and ice drum 41. Stand 19 may be connected to base 20 in any suitable manner. Alternatively, the stand 19 and base 20 may be made as a single unit.

A valve assembly 61 is connected to the stand 19 to dispense the slush beverage from the mixing chamber 21. The valve assembly 61 includes a valve 62, a connector 63 and a handle 64. The connector 63 joins the handle 64 to the valve 62. Moving the handle 64 opens the valve assembly, thereby dispensing the slush beverage from the mixing chamber 21 when crank assembly 12 is being rotated.

The mixing chamber 21, as shown in FIGS. 1–6, is a container that receives the sugar, water and other ingredients to make a sugar water solution. The mixing chamber 21 is connected to the stand 19 in any suitable manner, such as by gluing or ultrasonic welding. An opening 28 in base 25 of the mixing chamber 21 is aligned with the valve 62 of the valve assembly 61. The mixing chamber 21 has a wall 22 extending substantially perpendicularly from base 25 to define a mixing area 26. Wall 22 has an inner surface 23 and an outer surface 24. Cover 27 snaps onto wall 22 to enclose the mixing chamber 21. A blowby area 29 is formed in wall 22. The blowby area 29 extends longitudinally from base 25 to a distal end of wall 22. The blowby area 29 is outside the auger area 84 (FIGS. 5 and 6) covered by the rotation of the auger 31, so that a flow path is created beyond the outer edges 39 of the auger blade 32. Preferably, the mixing chamber 21 is substantially cylindrical. Preferably, the mixing chamber 21 and cover 27 are made of plastic.

The ice drum 41, as shown in FIGS. 1–6, is a container that receives ice and salt to form an ice mixture. The ice drum 41 is received within the housing chamber 21. The ice drum has a wall 43 that extends substantially perpendicularly from base 46 to define an ice mixture receiving area 42. Ice drum wall 43 has an inner surface 44 and an outer surface 45. A recess 47 in the base 46 of the ice drum receives an ice blade 51. A lid 49 covers the ice drum 41. An opening 48 enables ice blade 51 to pass through the lid 49. Preferably, the ice drum 41 is substantially cylindrical. Preferably, ice drum 41 is made of metal to better facilitate heat transfer through the ice drum.

Figure 7:
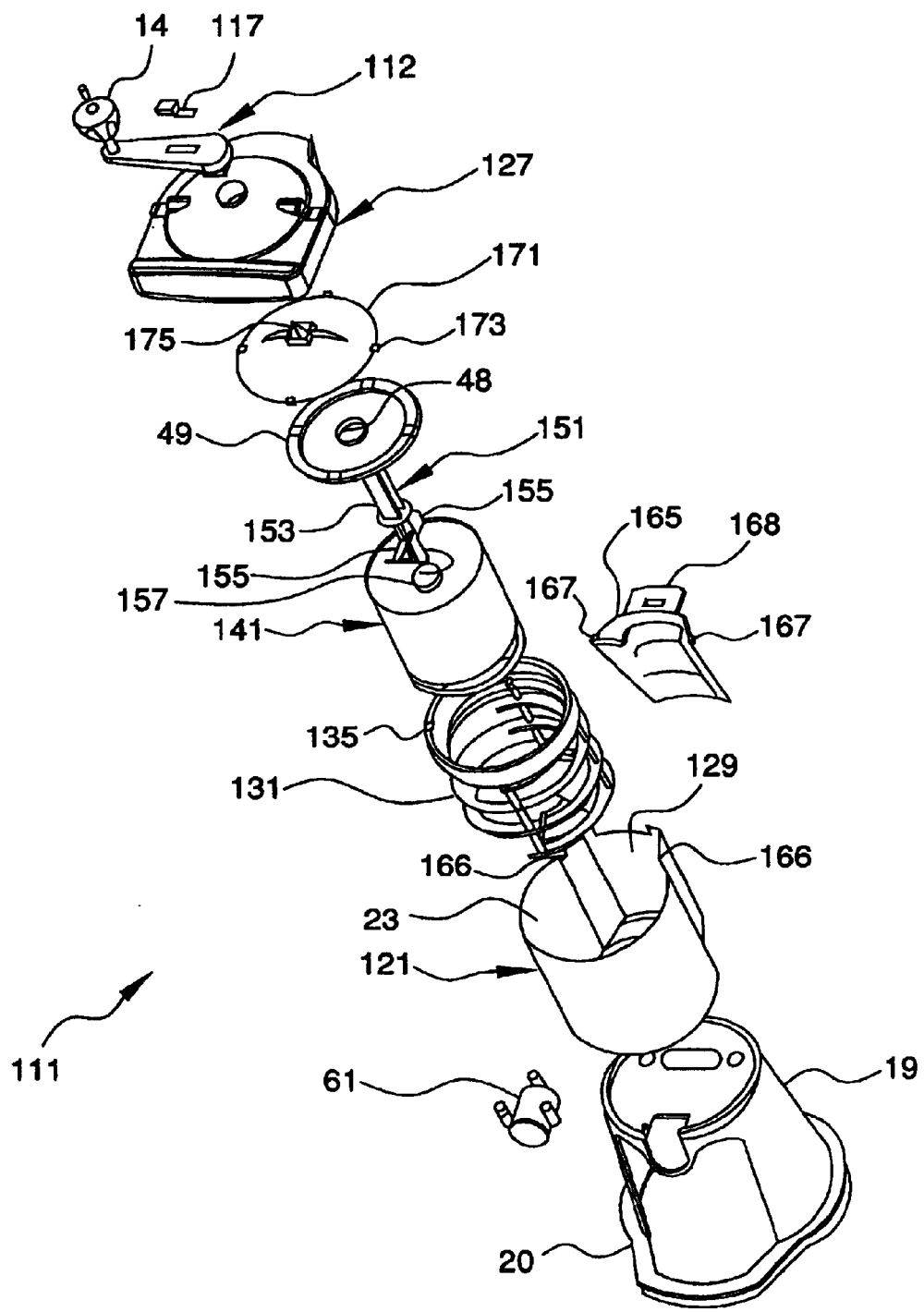
FIG. 7 is an exploded perspective view of the slush beverage maker according to a second embodiment of the present invention.

A lower end 54 of an ice blade 51 receives bearing 57 and bushing 59 that enable rotation of the blade relative to the ice drum 41. Alternatively, as shown in FIG. 7, a bearing assembly 157 may be permanently fixed to the ice blade 151. The bearing 57 and bushing 59 are received by the recess 47 in the base 46 of the ice drum 41. The ice blade 51 has a post 53 and a plurality of substantially flat blades 55 extending laterally outward from the post. Upper end 56 of the post 53 is a flat blade received by a second slot 75 in engagement disc 71. Preferably, the ice blade 51 is made of metal.

Auger 31 is positioned within the mixing chamber 21 between inner surface 23 of wall 22 and outer surface 45 of wall 43 of ice drum 41. As shown in FIG. 1, the auger 31 is a single blade 32 having a helical shape. A first end 37 of the auger blade 32 is connected to rim 36. The second end 38 of auger blade 32 is connected to wiper 33. Posts 34 extend longitudinally along outer edges of the auger blade to provide rigidity to the auger 31. A plurality of tabs 35 extend longitudinally upward from the auger rim 36. The tabs 35 are received by first slots 73 in engagement disc 71.

Engagement disc 71 has a plurality of first slots 73 for receiving tabs 35 on the auger rim 36. A second slot 77 receives the flat blade portion 56 of ice blade 51. A hub 77 is rigidly connected to an upper surface 79 of engagement disc 71. Preferably, the hub 77 is hexagonal.

Mixing top 81 fits inside mixing chamber 21. An outer surface 85 of wall 83 of mixing top 81 mates with the inner surface 23 of wall 22 of mixing chamber 21.

Lid 27 covers the slush beverage maker 11. An opening 30 in the lid 27 receives a first end 15 of crank arm 13 of crank assembly 12. A second end 16 of crank arm 13 receives a knob 14. First end 15 of crank arm 13 mates with hub 77 of engagement disc 71. Preferably, first end 15 of crank arm is hexagonal for mating with a hexagonal engagement disc hub.

Figure 8:
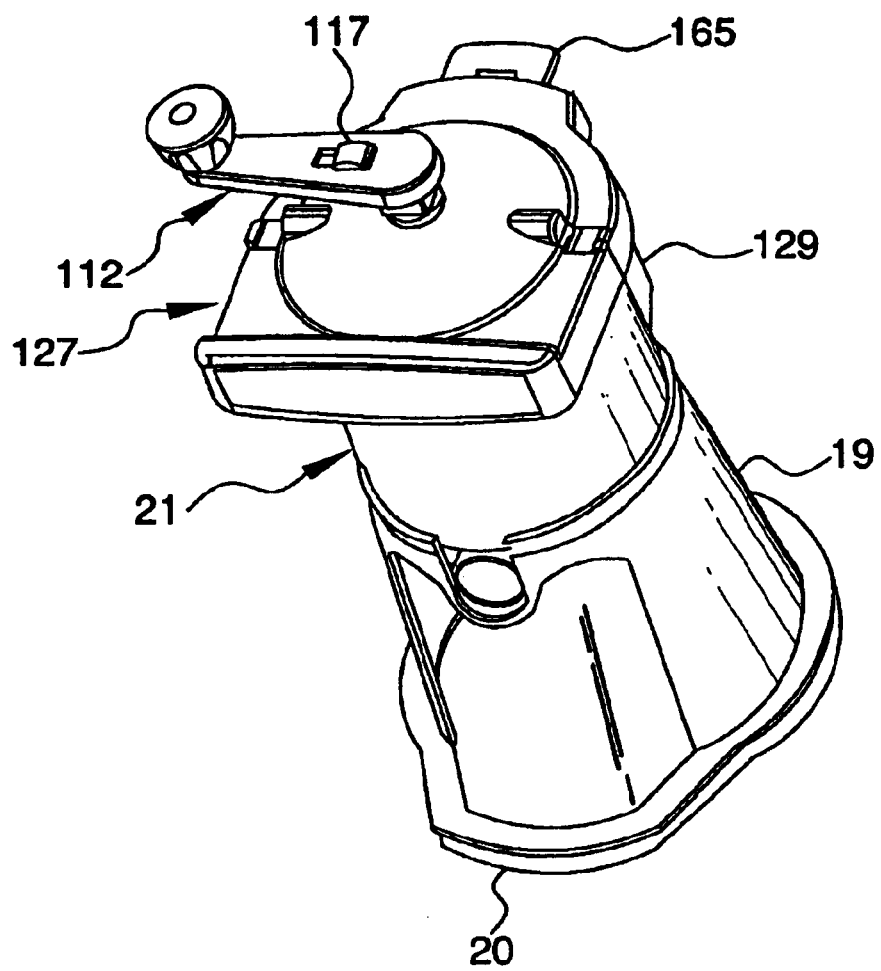
FIG. 8 is a perspective view of the slush beverage maker of FIG. 2.

The second embodiment, as shown in FIGS. 7 and 8, is functionally equivalent to the first embodiment, but has slight structural differences. Reference numbers are identical where no difference exists between parts of the first and second embodiment. The ice blade 151 has the bearing and bushing assembly 157 permanently attached to the ice blade. Upper portion 153 of the ice blade 151 is rectangular to connect to the rectangular opening 175 of the engagement disc 171. The auger 131 has slots 135 for receiving tabs 173 of the engagement disc 171. Lid 127 connects to mixing chamber 121. Blowby paddle 165 has two mounting posts 167 that mate with mounting slots 166 of chamber 121. Blowby paddle 165 rotates around mounting posts 167 by pressing down on handle 168. Locking member 117 locks upper end 153 of ice blade 151 to the crank assembly 112. As shown in FIG. 7, any suitable configuration of blade 155 is acceptable in order to adequately stir the ice and salt mixture in the ice container.

Assembly and Operation

Figure 2:
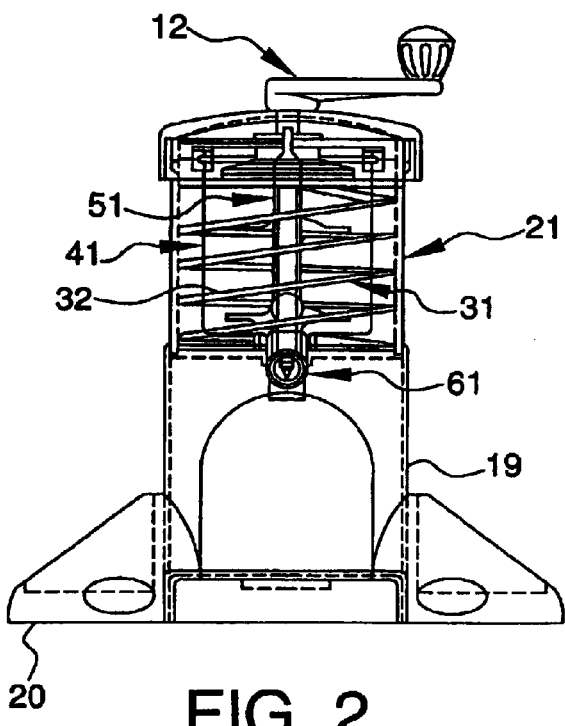
FIG. 2 is a front elevational view of the slush beverage maker of FIG. 1.
Figure 3:
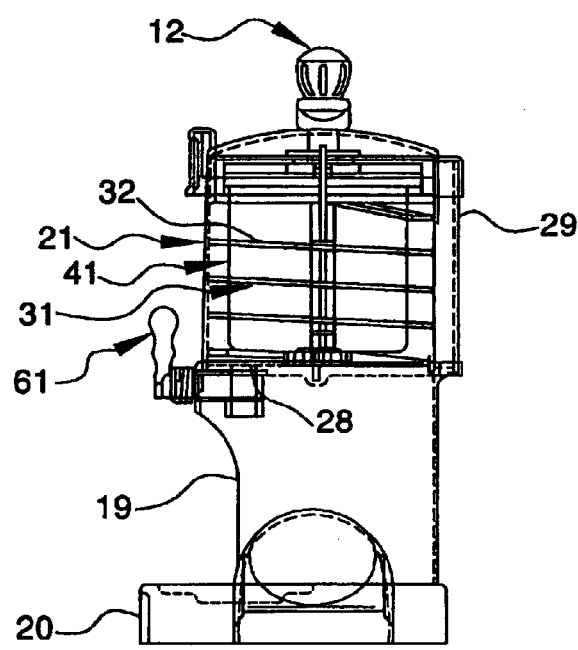
FIG. 3 is a side elevational view of the slush beverage maker of FIG. 1.
Figure 4:
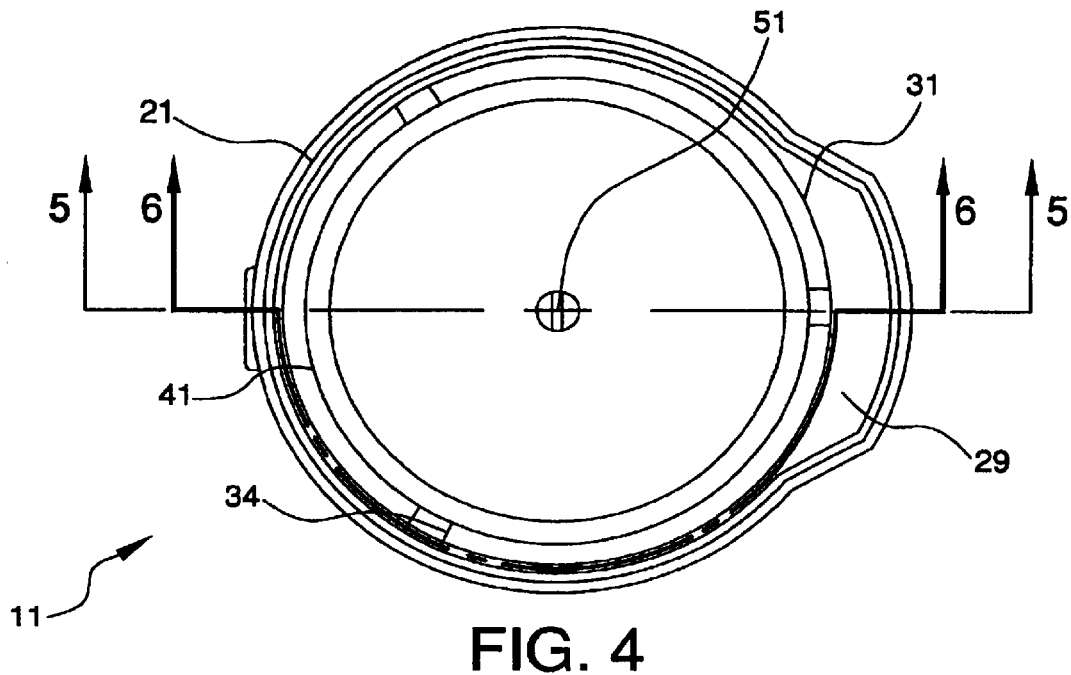
FIG. 4 is a top view of the slush beverage maker of FIG. 1 showing the blowby area.
Figure 5:
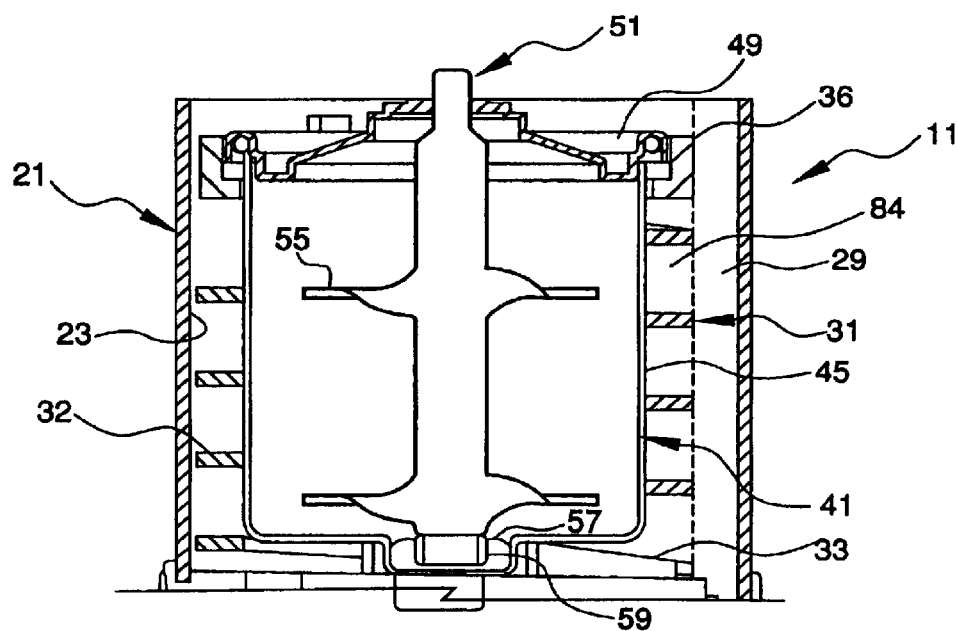
FIG. 5 is a cross sectional elevational view along line 5–5 of FIG. 4 showing the blowby area.
Figure 6:
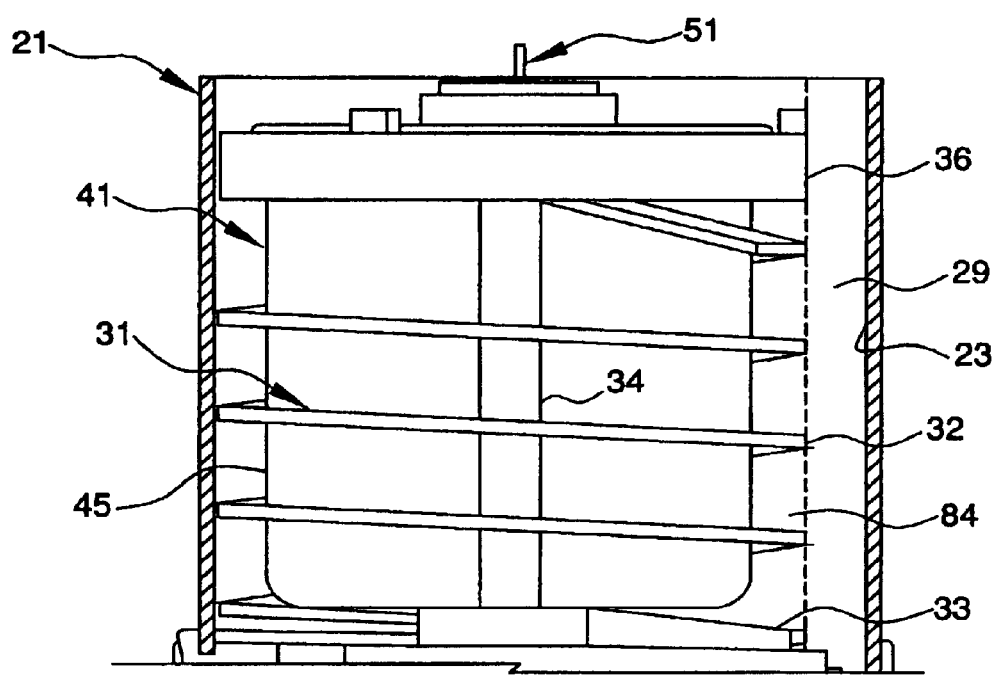
FIG. 6 is a cross sectional elevational view along line 6–6 of FIG. 4 showing the blowby area.

A fully assembled slush beverage maker according to a first embodiment of the present invention is shown in FIGS. 2 and 3. The mixing chamber 21 is preferably permanently attached to the base 20 and stand 19. The valve assembly 61 is attached to the stand 19.

The ice blade 51 with the bearing 57 and bushing 59 is inserted into the ice drum 41. Ice cubes and salt are added to the ice drum 41 to make an ice mixture. Ice drum lid 49 is then placed on the ice drum 41.

The auger 31 is inserted in the mixing chamber 21. The ice drum assembly is then inserted into the mixing chamber 21 inside the auger 31. The ice drum 41 connects to base 19 to prevent rotation of the ice drum. Water, sugar and other ingredients are added to the mixing chamber 21 to make a sugar water solution. Alternatively soda, root beer or any other sugar containing commercial beverage may be used. The engagement disc 71 is then connected to both the auger 31 and the ice blade 51. Slots 73 in the engagement disc 71 receive tabs 35 on the auger 31 to connect the auger to the engagement disc so that the auger rotates with the engagement disc. The upper end 56 of the ice blade 51 is connected to the engagement disc hub 77 so that the ice blade rotates with the engagement disc. The mixing top 81 is then inserted within the mixing chamber 21. The lid 27 snaps to wall 22 of the mixing chamber 21.

First end of crank arm is then connected to the engagement disc hub 77 to completely assemble the slush beverage maker as shown in FIGS. 2 and 3.

The slush beverage maker 11 operates by mixing and rotating the slush mixture in the housing chamber 21 that surrounds the ice drum 41 containing the ice mixture. Thermal equilibration transfers the cold from the ice mixture in the ice drum 41 to the sugar water solution outside the drum, thereby freezing the sugar water solution. Keeping the sugar water solution in motion throughout the thermal equilibration process produces a slush mixture from the sugar water solution. The sugar water solution freezes and sticks to the ice drum during the process. The rotating auger 31 scrapes the ice crystals off the outer surface 45 of the ice drum 41 and keeps the ice crystals in motion. The rotating auger 31 also provides the downward force to dispense the slush beverage from the mixing chamber 21. Wiper 33 on the auger 31 sweeps slush beverage along the bottom 25 of the mixing chamber 21, preventing slush mixture from freezing or sticking to the bottom of the mixing chamber.

Ice and salt are added to the ice drum 41 to make an ice mixture. The salt reduces the freezing point of water thus making the water (melted ice) colder. Making the water in the ice drum 41 colder accelerates the thermal equilibration process and speeds up the process of making the slush beverage. Rotating the hand crank assembly 12 spins both the ice blade 51 and the auger 31 simultaneously. Rotating the ice blade 51 within the ice drum 41 dramatically accelerates the equilibration process.

Rotating the auger 31 causes downward flow of the slush beverage. In order to provide continuous flow of the slush beverage, a blowby area 29 is provided in the mixing chamber 21 that allows slush beverage material to bypass the auger blades 32 when the blades are turning. The blowby area 29 is located in mixing chamber 21 outside the auger area 84 formed by the rotation of the auger 31, as shown in FIGS. 2–6, and runs vertically the full length of the mixing chamber. The blowby area 29 releases pressure that builds up at the bottom of the chamber as the slush beverage starts to freeze. This pressure release keeps the auger moving freely through the slush beverage mixture throughout the freezing process.

The auger 31 fits with very tight tolerances between the ice drum 41 and the inside wall 23 of the mixing chamber 21. The auger 31, which is essentially a screw, forces the slush beverage to the bottom of the mixing chamber. The blowby area 29 allows a pathway for the slush beverage mixture to flow from the bottom 25 of the mixing chamber 21 to the top of the mixing chamber in response to the movement of slush material being forced to the bottom of the chamber by the auger 31. The blowby area 29 provides this pathway for the slush beverage mixture, whether liquid or frozen, that is being driven down by the auger 31 that would have no outlet except to backflow around the outside and inside of the auger. Since the tolerances are very tight, the backflow would be very small, thereby reducing the function of the auger to a mixer.

Opening the valve assembly 61 opens opening 28 in the bottom of the mixing chamber 21 allowing slush beverage to be dispensed from the slush beverage maker 11 when crank assembly 12 is being turned.

The second embodiment operates in substantially the same way as the first embodiment with the exception of the addition of the blowby paddle 165. During operation of the slush beverage maker, the blowby paddle handle 168 is depressed to rotate the paddle 165 around the posts 167 in slots 166. The rotation of the paddle 165 pushes slush beverage material in the blowby area 129 onto the auger 131. This function is particularly useful when the operator wants to dispense the entire slush beverage from the container mixing chamber 121.

While advantageous embodiments have been chosen to illustrate the invention, it will be understood by those skilled in the art that various changes and modifications may be made therein without departing from the scope of the invention as defined in the appended claims.

What is claimed is:

1. A mixing assembly, comprising:
    a first container having a first base and a first wall extending upwardly therefrom for receiving a solution;
    a second container having a second base and a second wall extending upwardly therefrom and substantially disposed within said first container for receiving a chilling mixture to cool the solution in said first container;
    an auger having an auger blade substantially disposed in said first container between said first wall and said second wall to move the solution, an auger area being defined by rotation of said auger blade; and
    a blowby area within said first container outside of said auger area to provide a flow path for the solution.

2. A mixing assembly according to claim 1, wherein an ice blade is substantially disposed within said second container to rotate the chilling mixture.

3. A mixing assembly according to claim 1, wherein a handle is connected to said auger for manual rotation of said auger blade.

4. A mixing assembly according to claim 1, wherein said auger blade has a substantially helical shape.

5. A mixing assembly according to claim 1, wherein said auger has a scraper for scraping said first base of said first container.

6. A mixing assembly according to claim 1, wherein a handle is connected to said auger and to said ice blade for simultaneous rotation of said auger blade and said ice blade.

7. A mixing assembly according to claim 1, wherein a paddle is connected to said first container for moving solution from said blowby area to said auger area.

8. A mixing assembly according to claim 1, wherein said first container is plastic.

9. A mixing assembly according to claim 1, wherein said auger is plastic.

10. A mixing assembly according to claim 1, wherein said second container is metallic.

11. A mixing assembly according to claim 1, wherein said ice blade is metallic.

12. A mixing assembly, comprising:
    a first container having a first base and a first wall extending upwardly therefrom for receiving a solution;
    a second container having a second base and a second wall extending upwardly therefrom and substantially disposed within said first container for receiving a chilling mixture to cool the solution in said first container;
    an auger having an auger blade substantially disposed in said first container between said first wall and said second wall to move the solution, an auger area being defined by rotation of said auger blade;
    a blowby area within said first container outside of said auger area to provide a flow path for the solution;
    an ice blade substantially disposed within said second container to rotate the chilling mixture;
    a handle connected to said auger for manual rotation of said auger blade and said ice blade simultaneously; and
    a paddle connected to said first container for moving solution from said blowby area to said auger area.

13. A mixing assembly according to claim 12, wherein said auger blade has a substantially helical shape.

14. A mixing assembly according to claim 12, wherein said auger has a scraper for scraping said first base of said first container.

15. A mixing assembly according to claim 12, wherein said first container is plastic.

16. A mixing assembly according to claim 12, wherein said auger is plastic.

17. A mixing assembly according to claim 12, wherein said second container is metallic.

18. A mixing assembly according to claim 12, wherein said ice blade is metallic.

19. A method of mixing, comprising:

adding a solution to a first container;

adding a chilling mixture to a second container disposed substantially within the first container;

rotating an auger blade in the first container to move the solution, the rotating of the auger blade defining an auger area;

rotating an ice blade in the second container to move the chilling mixture; and moving solution outside of the auger area by providing a blowby area outside of the auger area and inside the first container.

20. A method of mixing according to claim 19, further comprising moving solution from the blowby area to the auger area with a paddle.

21. A mixing assembly according to claim 1, wherein said mixing assembly is adapted to make a frozen mixture.

22. A mixing assembly according to claim 21, wherein said frozen mixture is a slush beverage, a smoothie or ice cream.

23. A mixing assembly according to claim 12, wherein said mixing assembly is adapted to make a frozen mixture.

24. A mixing assembly according to claim 23, wherein said frozen mixture is a slush beverage, a smoothie or ice cream.

25. A method of mixing according to claim 19, further comprising dispensing a frozen mixture from the first container.

26. A method of mixing according to claim 19, further comprising dispensing a slush beverage, a smoothie or ice cream from the first container.

* * * * *